United States Patent
Parvulescu et al.

(10) Patent No.: US 11,351,525 B2
(45) Date of Patent: Jun. 7, 2022

(54) USE OF AN ACID TREATMENT TO DECREASE THE PLASTICITY OF A COMPOSITION COMPRISING A TITANIUM-CONTAINING ZEOLITIC MATERIAL HAVING FRAMEWORK TYPE MWW

(71) Applicant: BASF SE, Ludwigshafen am Rhein (DE)

(72) Inventors: Andrei-Nicolae Parvulescu, Ludwigshafen (DE); Ulrich Mueller, Ludwigshafen (DE); Hans-Juergen Luetzel, Ludwigshafen (DE); Georg Uhl, Ludwigshafen (DE); Joaquim Henrique Teles, Ludwigshafen (DE); Dominic Riedel, Ludwigshafen (DE); Daniel Urbanczyk, Ludwigshafen (DE); Ulrike Wegerle, Worms (DE); Markus Weber, Ludwigshafen (DE); Nicolai Tonio Woerz, Ludwigshafen (DE); Christian Mueller, Ludwigshafen (DE); Ruediger Schmitt, Ludwigshafen (DE); Xiana Romani Fernandez, Ludwigshafen (DE); Harald Wuerz, Ludwigshafen (DE)

(73) Assignee: BASF SE

( * ) Notice: Subject to any disclaimer, the term of this patent is extended or adjusted under 35 U.S.C. 154(b) by 9 days.

(21) Appl. No.: 16/462,430

(22) PCT Filed: Dec. 20, 2017

(86) PCT No.: PCT/EP2017/083810
§ 371 (c)(1),
(2) Date: May 20, 2019

(87) PCT Pub. No.: WO2018/115118
PCT Pub. Date: Jun. 28, 2018

(65) Prior Publication Data
US 2019/0321811 A1  Oct. 24, 2019

(30) Foreign Application Priority Data
Dec. 20, 2016  (EP) .................................... 16205266

(51) Int. Cl.
*B01J 29/70* (2006.01)
*B01J 35/02* (2006.01)
*B01J 37/00* (2006.01)
*B01J 37/02* (2006.01)
*B01J 37/10* (2006.01)

(52) U.S. Cl.
CPC ......... *B01J 29/7088* (2013.01); *B01J 35/023* (2013.01); *B01J 37/0018* (2013.01); *B01J 37/0236* (2013.01); *B01J 37/10* (2013.01); *B01J 2229/186* (2013.01); *B01J 2229/37* (2013.01)

(58) Field of Classification Search
CPC .......................... B01J 29/7038; B01J 37/0009
See application file for complete search history.

(56) References Cited

U.S. PATENT DOCUMENTS

| | | | | |
|---|---|---|---|---|
| 8,211,822 B2 * | 7/2012 | Mueller | ............... | C07D 301/12 502/242 |
| 2015/0368115 A1 * | 12/2015 | Parvulescu | .......... | B01J 37/0045 423/706 |

FOREIGN PATENT DOCUMENTS

| | | |
|---|---|---|
| RU | 2332409 C2 | 8/2008 |
| WO | 2004/099166 A1 | 11/2004 |
| WO | WO 2013/117536 A2 | 8/2013 |
| WO | 2014/060261 A1 | 4/2014 |

OTHER PUBLICATIONS

International Search Report and Written Opinion of the International Searching Authority dated Mar. 14, 2018 in PCT/EP2018/083810 filed Dec. 20, 2017, 14 pages.
International Preliminary Report on Patentability dated Jun. 25, 2019 in PCT/EP2017/083810 filed Dec. 20, 2017, 8 pages.

\* cited by examiner

*Primary Examiner* — Colin W. Slifka
(74) *Attorney, Agent, or Firm* — Faegre Drinker Biddle & Reath LLP

(57) ABSTRACT

Use of an acid-treated titanium-containing zeolitic material having framework type MWW for preparing a composition having a relative plasticity of less than 1.

11 Claims, No Drawings

USE OF AN ACID TREATMENT TO DECREASE THE PLASTICITY OF A COMPOSITION COMPRISING A TITANIUM-CONTAINING ZEOLITIC MATERIAL HAVING FRAMEWORK TYPE MWW

The present invention is directed to the use of an acid-treated titanium-containing zeolitic material having framework type MWW for preparing a composition having a relative plasticity $P_R$ of less than 1.

TiMWW catalysts, for example a ZnTiMWW, i.e. a catalyst comprising a titanium-containing zeolitic material having framework type MWW which further comprises zinc, are known as excellent catalysts for the epoxidation of propene. Such catalysts are usually prepared in a synthesis process involving a shaping stage such as an extrusion step where moldings are prepared which are preferred for catalysts used in industrial-scale processes such as the above-mentioned epoxidation process. A process for preparing such catalysts is disclosed, for example, in WO 2013/117536 A1. Since shaping is mandatory, the respective composition to be subjected to shaping should have a plasticity allowing the shaping. When investigating the above-mentioned catalysts, the inventors of the present invention surprisingly found that, depending on the specific nature of the titanium-containing zeolitic material used for preparing such a composition to be subjected to shaping, the respective composition exhibited plasticities which are too high for common shaping processes such as extrusion.

Therefore, it was an object of the present invention to provide a general solution for this problem. Surprisingly, it was found that if a titanium-containing zeolitic material having framework type MWW which is used as a component of the composition to be subjected to shaping, either as such or in a modified form such as further comprising zinc, is suitably acid-treated before it is used, the plasticity of the composition can be advantageously influenced, i.e. decreased compared to a composition which comprises the titanium-containing zeolitic material having framework type MWW in a non-acid-treated form.

Therefore, the present invention relates to the use of an acid-treated titanium-containing zeolitic material having framework type MWW for preparing a composition having a relative plasticity $P_R$ of less than 1, said composition comprising a titanium-containing zeolitic material having framework type MWW, wherein the relative plasticity is defined as the plasticity $P_A$ of said composition divided by the plasticity $P_N$ of a composition which differs from said composition in that the titanium-containing zeolitic material having framework type used for preparing the composition is not acid-treated, the plasticity $P_A$ and the plasticity $P_N$ being determined as described in Reference Example 3 herein.

Further, the present invention relates to a method for preparing a composition having a relative plasticity $P_R$ of less than 1 by using an acid-treated titanium-containing zeolitic material having framework type MWW, said composition comprising a titanium-containing zeolitic material having framework type MWW, wherein the relative plasticity is defined as the plasticity $P_A$ of said composition divided by the plasticity $P_N$ of a composition which differs from said composition in that the titanium-containing zeolitic material having framework type used for preparing the composition is not acid-treated, the plasticity $P_A$ and the plasticity $P_N$ being determined as described in Reference Example 3 herein.

Preferably, the acid-treated titanium-containing zeolitic material having framework type MWW is obtainable or obtained by a process comprising
(i) providing a titanium-containing zeolitic material having framework type MWW;
(ii) preparing the acid-treated titanium-containing zeolitic material having framework type MWW by subjecting the titanium-containing zeolitic material having framework type MWW provided in (i) to an acid treatment, comprising
(ii.1) preparing an aqueous suspension comprising an aqueous liquid phase and the titanium-containing zeolitic material having framework type MWW provided in (i), wherein the aqueous liquid phase comprises water and an acid;
(ii.2) heating the aqueous suspension according to (ii.1);
(ii.3) separating the acid-treated titanium-containing zeolitic material having framework type MWW from the liquid phase of the aqueous suspension according to (ii.2).

Preferably, the titanium-containing zeolitic material having framework type MWW provided in (i) has a water absorption capacity of at least 11 weight-%, more preferably in the range of from 11 to 20 weight-%, more preferably in the range of from 11 to 19 weight-%, more preferably in the range of from 11.5 to 18 weight-%, more preferably in the range of from 12 to 16 weight-%. Preferred ranges are, for example, from 12 to 14 weight-% or from 13 to 15 weight-% or from 14 to 16 weight-%.

With regard to the chemical composition of the titanium-containing zeolitic material having framework type MWW provided in (i), it is preferred that the zeolitic framework is substantially free of aluminum and essentially consists of silicon, oxygen, titanium and hydrogen. Optionally, the zeolitic framework may contain a certain amount of boron which may be present due to the specific method according to which the zeolitic material is prepared. Preferably, at least 99 weight-%, more preferably at least 99.5 weight-%, more preferably at least 99.9 weight-%, more preferably at least 99.99 weight-% of the zeolitic framework of the titanium-containing zeolitic material having framework type MWW provided in (i) consist of Ti, Si, O, and H. More preferably, at least 99 weight-%, more preferably at least 99.5 weight-%, more preferably at least 99.9 weight-%, more preferably at least 99.99 weight-% of the zeolitic material having framework type MWW provided in (i) consist of Ti, Si, O, and H. Preferably, at most 0.1 weight-%, more preferably at most 0.01 weight-%, more preferably at most 0.001 weight-% of the zeolitic framework of the titanium-containing zeolitic material having framework type MWW provided in (i) consist of boron. More preferably, at most 0.1 weight-%, more preferably at most 0.01 weight-%, more preferably at most 0.001 weight-% of the zeolitic material having framework type MWW provided in (i) consist of boron.

Preferably, the titanium-containing zeolitic material having framework type MWW provided in (i) comprises titanium, calculated as elemental titanium, in an amount in the range of from 0.1 to 5 weight-%, more preferably in the range of from 0.5 to 4 weight-%, more preferably in the range of from 1 to 3.5 weight-%, based on the total weight of the titanium-containing zeolitic material having framework type MWW. Preferred ranges are, for example, from 1 to 2 weight-% or from 1.5 to 2.5 weight-% or from 2 to 3 weight-% or from 2.5 to 3.5 weight-%.

Preferably, the titanium-containing zeolitic material having framework type MWW provided in (i) is a calcined titanium-containing zeolitic material having framework type MWW.

Preferably, the titanium-containing zeolitic material having framework type MWW comprises, preferably consists of particles exhibiting a specific particle size distribution which is preferably characterized by a Dv10 value in the range of from 1 to 5 micrometer, preferably in the range of from 2 to 4 micrometer, more preferably in the range of from 2 to 3 micrometer, a Dv50 value in the range of from 7 to 15 micrometer, preferably in the range of from 8 to 12 micrometer, more preferably in the range of from 8 to 11 micrometer, and a Dv90 value in the range of from 20 to 40 micrometer, preferably in the range of from 25 to 35 micrometer, more preferably in the range of from 26 to 32 micrometer, as determined according to Reference Example 4 herein.

Step (ii)

According to (ii), the the titanium-containing zeolitic material having framework type MWW provided in (i) is subjected to an acid treatment.

Preferably, in the aqueous suspension prepared in (ii.1), the weight ratio of the aqueous liquid phase relative to the titanium-containing zeolitic material having framework type MWW is in the range of from 10:1 to 30:1, preferably in the range of from 15:1 to 25:1, more preferably in the range of from 18:1 to 22:1.

The acid which is comprised in the aqueous liquid phase preferably comprises, more preferably is, one or more inorganic acids, preferably one or more of phosphoric acid, sulphuric acid, hydrochloric acid, and nitric acid. More preferably, the acid comprises sulphuric acid or nitric acid. More preferably, the acid is sulphuric acid or nitric acid. Preferably, the acid is at least partially, more preferably completely, dissolved in the water comprised in the aqueous liquid phase.

Generally, it is conceivable that the aqueous liquid phase according to (ii.1) comprises, in addition to the water and the acid, one or more further suitable compounds. Preferably, the liquid phase essentially consists of the acid and the water. More preferably, at least 99 weight-%, more preferably at least 99.5 weight-%, more preferably at least 99.9 weight-% of the aqueous liquid phase according to (ii.1) consist of water and the acid.

The pH of the aqueous liquid phase according to (ii.1), determined as described in Reference Example 2 herein, is preferably in the range of from 0 to 5, more preferably in the range of from 0 to 3, more preferably in the range of from 0 to 4, more preferably in the range of from 0 to 2.

Generally, it is conceivable that the aqueous suspension prepared in (ii.1) comprises, in addition to the water, the acid and the titanium-containing zeolitic material having framework type MWW, one or more further suitable compounds. Preferably, the aqueous suspension essentially consists of the water, the acid and the titanium-containing zeolitic material having framework type MWW. More preferably, at least 99 weight-%, more preferably at least 99.5 weight-%, more preferably at least 99.9 weight-% of the aqueous suspension prepared in (ii.1) consist of the aqueous liquid phase and the titanium-containing zeolitic material having framework type MWW.

Regarding (ii.2), it is preferred that the aqueous suspension according to (ii.1) is heated to a temperature of the suspension in the range of from 50 to 175° C., more preferably in the range of from 70 to 125° C., more preferably in the range of from 90 to 105° C. Preferred ranges are, for example, from 90 to 100 or from 95 to 105° C. According to (ii.2), the aqueous suspension can be kept at that temperature or different temperatures in the above-defined preferred ranges, for every suitable period of time. Preferably, the aqueous suspension is kept at said temperature for 0.1 to 24 h, more preferably for 0.3 to 6 h, more preferably for 0.5 to 1.5 h. It is preferred that the heating according to (ii.2) is carried out in a closed system under autogenous pressure, preferably in an autoclave. It is further preferred that heating the suspension and keeping the suspension at said temperature is carried out in a closed system under autogenous pressure, preferably in an autoclave. It is possible that during heating and/or during keeping the suspension at said temperature, the suspension is mechanically agitated, preferably stirred. After keeping the suspension at said temperature, the suspension is preferably cooled, for example to room temperature.

According to (ii.3), the acid-treated titanium-containing zeolitic material having framework type MWW is suitably separated from the liquid phase of the suspension. For this solid-liquid separation, every conceivable method or combination of two or more methods can be employed. Preferably, in (ii.3), the separating of the acid-treated titanium-containing zeolitic material having framework type MWW from the liquid phase of the aqueous suspension according to (ii.2) includes one or more of filtrating and centrifuging. Preferably, in (ii.3), the separating of the acid-treated titanium-containing zeolitic material having framework type MWW from the liquid phase of the aqueous suspension according to (ii.2) further includes drying the acid-treated titanium-containing zeolitic material having framework type MWW wherein the drying is preferably carried out in at a gas atmosphere at a temperature of the gas atmosphere preferably in the range of from 100 to 250° C., more preferably in the range of from 110 to 200° C., more preferably in the range of from 120 to 160° C. Every suitable gas atmosphere can be used wherein a preferred gas atmosphere comprises nitrogen. Therefore, a preferred gas atmosphere is air, lean air, or nitrogen such as technical nitrogen. Instead of filtrating and subsequent drying the filter cake, it may be preferred to subject the aqueous suspension to rapid-drying wherein prior to rapid-drying, the aqueous suspension can be either diluted or concentrated. Preferably, the separating of the acid-treated titanium-containing zeolitic material having framework type MWW according to (ii.3) from the liquid phase of the aqueous suspension according to (ii.2) using rapid-drying includes one or more of spray-drying, flash-drying, and microwave drying.

According to the present invention, it is preferred that the acid-treated titanium-containing zeolitic material having framework type MWW, preferably after separation from the liquid phase of the aqueous suspension according to (ii.2), more preferably after drying, is suitably calcined. Preferably, the acid-treated titanium-containing zeolitic material having framework type MWW is calcined in a gas atmosphere at a temperature of the gas atmosphere in the range of from 400 to 800° C., preferably in the range of from 500 to 750° C., more preferably in the range of from 600 to 700° C. Every suitable gas atmosphere can be used wherein a preferred gas atmosphere comprises nitrogen. Therefore, a preferred gas atmosphere is air, lean air, or nitrogen such as technical nitrogen.

Step (iii)

According to (iii), zinc is optionally incorporated in the acid-treated titanium-containing zeolitic material having framework type MWW according to (ii). Therefore, according to a first embodiment of the present invention, no zinc is incorporated in the acid-treated titanium-containing zeolitic material having framework type MWW according to (ii). According to a second and preferred embodiment of the present invention, it is preferred that according to (iii), zinc is incorporated in the acid-treated titanium-containing zeolitic material having framework type MWW according to (ii).

Regarding the incorporation of zinc according to (iii), no specific restrictions exist. Preferably, the incorporation of zinc comprises an impregnation, more preferably a wet impregnation, of the acid-treated titanium-containing zeolitic material having framework type MWW. Regarding the preferred wet impregnation, it is further preferred that it comprises (iii.1) preparing an aqueous suspension comprising an aqueous liquid phase and the acid-treated titanium-containing zeolitic material having framework type MWW, wherein the aqueous liquid phase comprises water and a dissolved zinc salt;

(iii.2) heating the aqueous suspension according to (iii.1);

(iii.3) separating the acid-treated titanium-containing zeolitic material having framework type MWW and comprising zinc from the liquid phase of the aqueous suspension according to (iii.2).

In the aqueous suspension prepared in (iii.1), the weight ratio of the aqueous liquid phase relative to the acid-treated titanium-containing zeolitic material having framework type MWW is preferably in the range of from 40:1 to 1:1, more preferably in the range of from 35:1 to 5:1, more preferably in the range of from 15:1 to 6:1.

Any suitably zinc salt can be employed. Preferably, the zinc salt comprises zinc acetate, preferably zinc acetate dihydrate. More preferably, the zinc salt is zinc acetate, preferably zinc acetate dihydrate.

In the aqueous suspension according to (iii.1), the weight ratio of the dissolved zinc salt, calculated as elemental zinc, relative to the acid-treated titanium-containing zeolitic material having framework type MWW is preferably in the range of from 0.01:1 to 0.2:1, more preferably in the range of from 0.02:1 to 0.1:1, more preferably in the range of from 0.04:1 to 0.06:1.

Generally, it is conceivable that the aqueous liquid phase according to (iii.1) comprises, in addition to the water and the dissolved zinc salt, one or more further compounds. Preferably, the aqueous liquid phase according to (iii.1) essentially consists of the water and the dissolved zinc salt. More preferably, at least 99 weight-%, more preferably at least 99.5 weight-%, more preferably at least 99.9 weight-% of the aqueous liquid phase according to (iii.1) consist of water and the dissolved zinc salt.

Generally, it is conceivable that the aqueous suspension prepared in (iii.1) comprises, in addition to the water and the dissolved zinc salt, one or more further compounds. Preferably, the aqueous suspension prepared in (iii.1) essentially consists of the water and the dissolved zinc salt. More preferably, at least 99 weight-%, more preferably at least 99.5 weight-%, more preferably at least 99.9 weight-% of the aqueous suspension prepared in (iii.1) consist of the aqueous liquid phase and acid-treated the titanium-containing zeolitic material having framework type MWW.

Regarding (iii.2), it is preferred that aqueous suspension according to (iii.1) is heated to a temperature of the suspension in the range of from 65 to 135° C., more preferably in the range of from 75 to 125° C., more preferably in the range of from 85 to 115° C. Preferred ranges are, for example, from 85 to 95° C. or from 90 to 100° C. or from 95 to 105° C. According to (iii.2), the aqueous suspension can be kept at that temperature or different temperatures in the above-defined preferred ranges, for every suitable period of time. Preferably, the aqueous suspension is kept at said temperature for 0.2 to 10 h, more preferably for 0.5 to 8 h, more preferably for 1 to 6 h.

According to (iii.3), the acid-treated titanium-containing zeolitic material having framework type MWW and comprising zinc is suitably separated from the liquid phase of the suspension. For this solid-liquid separation, every conceivable method or combination of two or more methods can be employed. Preferably, in (iii.3), the separating of the acid-treated titanium-containing zeolitic material having framework type MWW and comprising zinc from the liquid phase of the aqueous suspension according to (iii.2) includes one or more of filtrating and centrifuging. Preferably, in (iii.3), the separating of the acid-treated titanium-containing zeolitic material having framework type MWW and comprising zinc from the liquid phase of the aqueous suspension according to (iii.2) further includes drying the acid-treated titanium-containing zeolitic material having framework type MWW wherein the drying is preferably carried out in at a gas atmosphere at a temperature of the gas atmosphere preferably in the range of from 100 to 300° C., more preferably in the range of from 150 to 275° C., more preferably in the range of from 200 to 250° C. Every suitable gas atmosphere can be used wherein a preferred gas atmosphere comprises nitrogen. Therefore, a preferred gas atmosphere is air, lean air, or nitrogen such as technical nitrogen. Instead of filtrating and subsequent drying the filter cake, it may be preferred to subject the aqueous suspension to rapid-drying wherein prior to rapid-drying, the aqueous suspension can be either diluted or concentrated. Preferably, the separating of the acid-treated titanium-containing zeolitic material having framework type MWW and comprising zinc according to (iii.3) from the liquid phase of the aqueous suspension according to (iii.2) using rapid-drying includes one or more of spray-drying, flash-drying, and microwave drying.

According to the present invention, it is preferred that the acid-treated titanium-containing zeolitic material having framework type MWW and comprising zinc, preferably after separation from the liquid phase of the aqueous suspension according to (iii.2), more preferably after drying, is suitably calcined. Preferably, the acid-treated titanium-containing zeolitic material having framework type MWW and comprising zinc is calcined in a gas atmosphere at a temperature of the gas atmosphere in the range of from 500 to 725° C., preferably in the range of from 600 to 700° C., more preferably in the range of from 625 to 675° C. Every suitable gas atmosphere can be used wherein a preferred gas atmosphere comprises nitrogen. Therefore, a preferred gas atmosphere is air, lean air, or nitrogen such as technical nitrogen.

Step (iv)

Preferably, preparing the composition having a relative plasticity $P_R$ of less than 1 further comprises (iv) mixing the titanium-containing zeolitic material having framework type MWW obtained from (ii) or (iii), preferably obtained from (iii), with a precursor of a silica binder, water, and a kneading agent.

Preferably, any suitable kneading agent can be employed. Preferably, the kneading agent comprised in the composition according to (iv) comprises, preferably is, one or more hydrophilic polymer, more preferably comprises, more preferably is, one or more carbohydrates, more preferably comprises, more preferably is, one or more of a cellulose and a cellulose derivative, more preferably comprises, more preferably is, one or more of a cellulose, a cellulose ether and a cellulose ester. More preferably, the kneading agent comprised in the composition according to (iv) comprises, preferably is, a cellulose ether, preferably a cellulose alkyl ether, more preferably a methyl cellulose. More preferably, the kneading agent comprised in the composition according to (iv) consists of a methyl cellulose. In the composition according to (iv), the weight ratio of the titanium-containing zeolitic material having framework type MWW relative to the kneading agent is in the range of from 5:1 to 20:1, preferably in the range of from 8:1 to 18:1, more preferably in the range of from 9:1 to 16:1.

Regarding the precursor of the silica binder, it is generally possible to use both colloidal silica and so-called "wet process" silica and so-called "dry process" silica. Particularly preferably this silica is amorphous silica, the size of the silica particles being, for example, in the range of from 1 to 100 nm and the surface area of the silica particles being in the range of from 50 to 500 m$^2$/g. Colloidal silica, preferably as an alkaline and/or ammoniacal solution, more preferably as an ammoniacal solution, is commercially available, inter alia, for example as Ludox®, Syton®, Nalco® or Snowtex®. "Wet process" silica is commercially available, inter alia, for example as Hi-Sil®, Ultrasil®, Vulcasil®, Santocel®, Valron-Estersil®, Reolosil®, Cab-O-Sil®, Fransil® or ArcSilica®. Inter alia, an ammoniacal solution of colloidal silica is preferred in the present invention. Preferably according to the present invention, the precursor of the silica binder comprised in the composition according to (iv) comprises, more preferably is, one or more of a silica gel, a precipitated silica, a fumed silica, and a colloidal silica. More preferably, the precursor of the silica binder comprised in the composition according to (iv) comprises, preferably is, a colloidal silica. More preferably, the precursor of the silica binder comprised in the composition according to (iv) consists of a colloidal silica. In the composition according to (iv), the weight ratio of the titanium-containing zeolitic material having framework type MWW relative to the precursor of the silica binder, calculated as SiO$_2$, is preferably in the range of from 1:1 to 10:1, more preferably in the range of from 3:1 to 7:1, more preferably in the range of from 3.5:1 to 4.5:1.

According to the present invention, the composition according to (iv) does not comprise a polyethylene oxide having a mean molecular weight MW (g/mol) of about 4,000,000, preferably does not comprise a polyethylene oxide having a mean molecular weight MW (g/mol) in the range of from 100,000 to 6,000,000, more preferably does not comprise a polyethylene oxide. Preferably, the composition according to (iv) does not comprise a polyalkylene oxide, more preferably does not comprise one or more of a polyalkylene oxides, a polystyrene, a polyacrylate, a polymethacrylate, a polyolefin, a polyamide, and a polyester.

Preferably, from 60 to 75 weight-%, more preferably from 63 to 72 weight-%, more preferably from 65 to 70 weight-% of the composition according to (iv) consist of water. At least a portion of the water comprised in the composition according to (iv) may be an ammonia-stabilized water.

More preferably, at least 99 weight-%, preferably at least 99.5 weight-%, more preferably at least 99.9 weight-% of the composition according to (iv) consist of the titanium-containing zeolitic material having framework type MWW obtained from (iii), the precursor of the silica binder, the water, and the kneading agent.

No specific restrictions exist how the composition according to (iv) is prepared. Preferably, preparing the composition comprises mechanically agitating, preferably kneading the composition, preferably until the individual components of the composition which were added in a suitable sequence together form a homogenous mass.

Preferably, the composition has a relative plasticity $P_R$ in the range of from 0.1 to 0.9, preferably in the range of from 0.2 to 0.6.

Preferably, the composition the composition having a relative plasticity $P_R$ of less than 1 has a plasticity $P_A$ of at most 1,500 N, preferably in the range of from 400 to 1,250 N, more preferably in the range of from 450 to 1,000 N, as determined according to Reference Example 3 herein.

According to the present invention, it is possible that for lowering the relative plasticity $P_R$ of the composition, one or more of a polystyrene, a polyacrylate, a polymethacrylate, a polyolefin, a polyamide, and a polyester are employed as an additional component of said composition. Preferably, for lowering the relative plasticity $P_R$ of the composition, a polyalkylene oxide, preferably a polyethylene oxide can be employed as an additional component of said composition. Therefore, the present invention also relates to the use of a polyethylene oxide for decreasing the plasticity of a composition comprising a titanium-containing zeolitic material having framework type MWW or a method for decreasing the plasticity of a composition comprising a titanium-containing zeolitic material having framework type MWW by using a polyethylene oxide as a component of said composition.

The present invention is further illustrated by the following set of embodiments and combinations of embodiments resulting from the dependencies and back-references as indicated. In particular, it is noted that in each instance where a range of embodiments is mentioned, for example in the context of a term such as "The use of any one of embodiments 1 to 4", every embodiment in this range is meant to be explicitly disclosed for the skilled person, i.e. the wording of this term is to be understood by the skilled person as being synonymous to "The use of any one of embodiments 1, 2, 3, and 4".

1. Use of an acid-treated titanium-containing zeolitic material having framework type MWW for preparing a composition having a relative plasticity $P_R$ of less than 1, said composition comprising a titanium-containing zeolitic material having framework type MWW, wherein the relative plasticity is defined as the plasticity $P_A$ of said composition divided by the plasticity $P_N$ of a composition which differs from said composition in that the titanium-containing zeolitic material having framework type used for preparing the composition is not acid-treated, the plasticity $P_A$ and the plasticity $P_N$ being determined as described in Reference Example 3 herein;
or
a method for preparing a composition having a relative plasticity $P_R$ of less than 1 by using an acid-treated titanium-containing zeolitic material having framework type MWW, said composition comprising a titanium-containing zeolitic material having framework type MWW, wherein the relative plasticity is defined as the plasticity $P_A$ of said composition divided by the plasticity $P_N$ of a composition which differs from said composition in that the titanium-containing zeolitic material having framework type used for preparing the composition is not acid-treated, the plasticity $P_A$ and the plasticity $P_N$ being determined as described in Reference Example 3 herein.

2. The use or the method of embodiment 1, wherein the acid-treated titanium-containing zeolitic material having framework type MWW is obtainable or obtained by a process comprising
  (i) providing a titanium-containing zeolitic material having framework type MWW;
  (ii) preparing the acid-treated titanium-containing zeolitic material having framework type MWW by subjecting the titanium-containing zeolitic material having framework type MWW provided in (i) to an acid treatment, comprising
    (ii.1) preparing an aqueous suspension comprising an aqueous liquid phase and the titanium-containing zeolitic material having framework type MWW provided in (i), wherein the aqueous liquid phase comprises water and an acid;
    (ii.2) heating the aqueous suspension according to (ii.1);
    (ii.3) separating the acid-treated titanium-containing zeolitic material having framework type MWW from the liquid phase of the aqueous suspension according to (ii.2).

3. The use or the method of embodiment 1, comprising preparing the acid-treated titanium-containing zeolitic material having framework type MWW by a process comprising
  (i) providing a titanium-containing zeolitic material having framework type MWW;
  (ii) preparing the acid-treated titanium-containing zeolitic material having framework type MWW by subjecting the titanium-containing zeolitic material having framework type MWW provided in (i) to an acid treatment, comprising
    (ii.1) preparing an aqueous suspension comprising an aqueous liquid phase and the titanium-containing zeolitic material having framework type MWW provided in (i), wherein the aqueous liquid phase comprises water and an acid;
    (ii.2) heating the aqueous suspension according to (ii.1);
    (ii.3) separating the acid-treated titanium-containing zeolitic material having framework type MWW from the liquid phase of the aqueous suspension according to (ii.2).

4. The use or the method of embodiment 2 or 3, wherein at least 99 weight-%, preferably at least 99.5 weight-%, more preferably at least 99.9 weight-% of the zeolitic framework of the titanium-containing zeolitic material having framework type MWW provided in (i) consist of Ti, Si, O, and H.

5. The use or the method of any one of embodiments 2 to 4, wherein the titanium-containing zeolitic material having framework type MWW provided in (i) comprises titanium, calculated as elemental titanium, in an amount in the range of from 0.1 to 5 weight-%, preferably in the range of from 0.5 to 4 weight-%, more preferably in the range of from 1 to 3.5 weight-%, based on the total weight of the titanium-containing zeolitic material having framework type MWW.

6. The use or the method of any one of embodiments 2 to 5, wherein the titanium-containing zeolitic material having framework type MWW provided in (i) is a calcined titanium-containing zeolitic material having framework type MWW.

7. The use or the method of any one of embodiments 2 to 6, wherein the titanium-containing zeolitic material having framework type MWW provided in (i) comprises, preferably consists of particles exhibiting a particle size distribution characterized by a Dv10 value in the range of from 1 to 5 micrometer, preferably in the range of from 2 to 4 micrometer, a Dv50 value in the range of from 7 to 15 micrometer, preferably in the range of from 8 to 12 micrometer, and a Dv90 value in the range of from 20 to 40 micrometer, preferably in the range of from 25 to 35 micrometer, as determined according to Reference Example 4 herein.

8. The use or the method of any one of embodiments 2 to 7, wherein in the aqueous suspension prepared in (ii.1), the weight ratio of the aqueous liquid phase relative to the titanium-containing zeolitic material having framework type MWW is in the range of from 10:1 to 30:1, preferably in the range of from 15:1 to 25:1, more preferably in the range of from 18:1 to 22:1.

9. The use or the method of any one of embodiments 2 to 8, wherein the acid comprised in the aqueous liquid phase comprises, preferably is, is one or more inorganic acids, preferably one or more of phosphoric acid, sulphuric acid, hydrochloric acid, and nitric acid, wherein more preferably, the acid comprises, preferably is, nitric acid.

10. The use or the method of any one of embodiments 2 to 9, wherein at least 99 weight-%, preferably at least 99.5 weight-%, more preferably at least 99.9 weight-% of the aqueous liquid phase according to (ii.1) consist of water and the acid.

11. The use or the method of any one of embodiments 2 to 10, wherein the aqueous liquid phase according to (ii.1) has a pH in the range of from 0 to 5, preferably in the range of from 0 to 3, more preferably in the range of from 0 to 2, determined as described in Reference Example 2 herein.

12. The use or the method of any one of embodiments 2 to 11, wherein at least 99 weight-%, preferably at least 99.5 weight-%, more preferably at least 99.9 weight-% of the aqueous suspension prepared in (ii.1) consist if the aqueous liquid phase and the titanium-containing zeolitic material having framework type MWW.

13. The use or the method of any one of embodiments 2 to 12, wherein in (ii.2), the aqueous suspension according to (ii.1) is heated to a temperature of the suspension in the range of from 50 to 175° C., preferably in the range of from 70 to 125° C., more preferably in the range of from 95 to 105° C.

14. The use or the method of embodiment 13, wherein in (ii.2), the aqueous suspension is kept at said temperature for 0.1 to 6 h, preferably for 0.3 to 2 h, more preferably for 0.5 to 1.5 h.

15. The use or the method of any one of embodiments 2 to 14, wherein the heating according to (ii.2) is carried out in a closed system under autogenous pressure, preferably in an autoclave.

16. The use or the method of any one of embodiments 2 to 15, wherein in (ii.3), the separating of the acid-treated titanium-containing zeolitic material having framework type MWW from the liquid phase of the aqueous suspension according to (ii.2) includes one or more of filtrating and centrifuging.

17. The use or the method of embodiment 15, wherein the separating of the acid-treated titanium-containing zeolitic material having framework type MWW from the liquid phase of the aqueous suspension according to (ii.2) further includes drying the acid-treated titanium-containing zeolitic material having framework type MWW.

18. The use or the method of embodiment 17, wherein the acid-treated titanium-containing zeolitic material having framework type MWW is dried in a gas atmosphere at a temperature of the gas atmosphere in the range of from 100 to 250° C., preferably in the range of from 110 to 200° C., more preferably in the range of from 120 to 160° C.

19. The use or the method of any one of embodiments 2 to 18, wherein in (ii.3), the separating of the acid-treated titanium-containing zeolitic material having framework type MWW from the liquid phase of the aqueous suspension according to (ii.2) includes one or more of spray-drying, flash-drying, and microwave drying.

20. The use or the method of any one of embodiments 2 to 19, preferably of any one of embodiments 16 to 18, wherein in (ii.3), the separating of the acid-treated titanium-containing zeolitic material having framework type MWW from the liquid phase of the aqueous suspension according to (ii.2) further comprises calcining the acid-treated titanium-containing zeolitic material having framework type MWW, preferably the dried acid-treated titanium-containing zeolitic material having framework type MWW.

21. The use or the method of embodiment 20, wherein the acid-treated titanium-containing zeolitic material having framework type MWW is calcined in a gas atmosphere at a temperature of the gas atmosphere in the range of from 400 to 800° C., preferably in the range of from 500 to 750° C., more preferably in the range of from 600 to 700° C.

22. The use or the method of any one of embodiments 2 to 21, wherein the process further comprises
 (iii) incorporating zinc in the acid-treated titanium-containing zeolitic material having framework type MWW according to (ii).

23. The use or the method of embodiment 22, wherein in (iii), the incorporating of zinc comprises an impregnation, preferably a wet impregnation, of the acid-treated titanium-containing zeolitic material having framework type MWW.

24. The use or the method of embodiment 22 or 23, wherein in (iii), the incorporating of zinc comprises
 (iii.1) preparing an aqueous suspension comprising an aqueous liquid phase and the acid-treated titanium-containing zeolitic material having framework type MWW, wherein the aqueous liquid phase comprises water and a dissolved zinc salt;
 (iii.2) heating the aqueous suspension according to (iii.1);
 (iii.3) separating the acid-treated titanium-containing zeolitic material having framework type MWW and comprising zinc from the liquid phase of the aqueous suspension according to (iii.2).

25. The use or the method of embodiment 24, wherein in the aqueous suspension prepared in (iii.1), the weight ratio of the aqueous liquid phase relative to the acid-treated titanium-containing zeolitic material having framework type MWW is in the range of from 40:1 to 1:1, preferably in the range of from 35:1 to 5:1, more preferably in the range of from 15:1 to 6:1.

26. The use or the method of embodiment 24 or 25, wherein the zinc salt comprises, preferably is, zinc acetate, preferably zinc acetate dihydrate.

27. The use or the method of any one of embodiments 24 to 26, wherein in the aqueous suspension according to (iii.1), the weight ratio of the dissolved zinc salt, calculated as elemental zinc, relative to the acid-treated titanium-containing zeolitic material having framework type MWW is in the range of from 0.01:1 to 0.2:1, preferably in the range of from 0.02:1 to 0.1:1, more preferably in the range of from 0.04:1 to 0.06:1.

28. The use or the method of any one of embodiments 24 to 27, wherein at least 99 weight-%, preferably at least 99.5 weight-%, more preferably at least 99.9 weight-% of the aqueous liquid phase according to (iii.1) consist of water and the dissolved zinc salt.

29. The use or the method of any one of embodiments 24 to 28, wherein at least 99 weight-%, preferably at least 99.5 weight-%, more preferably at least 99.9 weight-% of the aqueous suspension prepared in (iii.1) consist of the aqueous liquid phase and acid-treated the titanium-containing zeolitic material having framework type MWW.

30. The use or the method of any one of embodiments 24 to 29, wherein in (iii.2), the aqueous suspension according to (iii.1) is heated to a temperature of the suspension in the range of from 65 to 135° C., preferably in the range of from 75 to 125° C., more preferably in the range of from 85 to 115° C.

31. The use or the method of embodiment 30, wherein in (iii.2), the aqueous suspension is kept at said temperature for 1 to 10 h, preferably for 2 to 8 h, more preferably for 3 to 6 h.

32. The use or the method of any one of embodiments 24 to 31, wherein in (iii.3), the separating of the acid-treated titanium-containing zeolitic material having framework type MWW and comprising zinc from the liquid phase of the aqueous suspension according to (iii.2) includes one or more of filtrating and centrifuging.

33. The use or the method of embodiment 32, wherein the separating of the acid-treated titanium-containing zeolitic material having framework type MWW and comprising zinc from the liquid phase of the aqueous suspension according to (iii.2) further includes drying the acid-treated titanium-containing zeolitic material having framework type MWW and comprising zinc.

34. The use or the method of embodiment 33, wherein the acid-treated titanium-containing zeolitic material having framework type MWW is dried at a gas atmosphere at a temperature of the gas atmosphere in the range of from 100 to 300° C., preferably in the range of from 150 to 275° C., more preferably in the range of from 200 to 250° C.

35. The use or the method of any one of embodiments 24 to 34, wherein in (iii.3), the separating of the acid-treated titanium-containing zeolitic material having framework type MWW and comprising zinc from the liquid phase of the aqueous suspension according to (iii.2) includes one or more of spray-drying, flash-drying, and microwave drying.

36. The use or the method of any one of embodiments 24 to 35, preferably of any one of embodiments 32 to 34, wherein in (iii.3), the separating of the acid-treated titanium-containing zeolitic material having framework type MWW and comprising zinc from the liquid phase of the aqueous suspension according to (iii.2) further comprises calcining the acid-treated titanium-containing zeolitic material having framework type MWW and comprising zinc, preferably the dried acid-treated titanium-containing zeolitic material having framework type MWW and comprising zinc.

37. The use or the method of embodiment 36, wherein the acid-treated titanium-containing zeolitic material having framework type MWW and comprising zinc is calcined in a gas atmosphere at a temperature of the gas atmosphere in the range of from 500 to 725° C., preferably in the range of from 600 to 700° C., more preferably in the range of from 625 to 657° C.

38. The use or the method of any one of embodiments 2 to 37, preferably of any one of embodiments 22 to 37, wherein preparing the composition having a relative plasticity $P_R$ of less than 1 comprises
 (iv) mixing the titanium-containing zeolitic material having framework type MWW obtained from (ii) or (iii), preferably obtained from (iii), with a precursor of a silica binder, water, and a kneading agent.

39. The use or the method of embodiment 38, wherein the kneading agent comprised in the composition according to (iv) comprises, preferably is, one or more hydrophilic polymer, more preferably comprises, more preferably is, one or more carbohydrates, more preferably comprises, more preferably is, one or more of a cellulose and a cellulose derivative, more preferably comprises, more preferably is, one or more of a cellulose, a cellulose ether and a cellulose ester.

40. The use or the method of embodiment 38 or 39, wherein the kneading agent comprised in the composition according to (iv) comprises, preferably is, a cellulose ether, preferably a cellulose alkyl ether, more preferably a methyl cellulose.

41. The use or the method of any one of embodiments 38 to 40, wherein in the composition according to (iv), the weight ratio of the titanium-containing zeolitic material having framework type MWW relative to the kneading agent is in the range of from 5:1 to 20:1, preferably in the range of from 8:1 to 18:1, more preferably in the range of from 9:1 to 16:1.

42. The use or the method of any one of embodiments 38 to 41, wherein the precursor of the silica binder comprised in the composition according to (iv) comprises, preferably is, one or more of a silica gel, a precipitated silica, a fumed silica, and a colloidal silica.

43. The use or the method of any one of embodiments 38 to 42, wherein the precursor of the silica binder comprised in the composition according to (iv) comprises, preferably is, a colloidal silica.

44. The use or the method of any one of embodiments 38 to 43, wherein in the composition according to (iv), the weight ratio of the titanium-containing zeolitic material having framework type MWW relative to the precursor of the silica binder, calculated as $SiO_2$, is in the range of from 1:1 to 10:1, preferably in the range of from 3:1 to 7:1, more preferably in the range of from 3.5:1 to 4.5:1.

45. The use or the method of any one of embodiments 38 to 44, wherein the composition according to (iv) does not comprise a polyalkylene oxide, preferably does not comprise one or more of a polyalkylene oxides, a polystyrene, a polyacrylate, a polymethacrylate, a polyolefin, a polyamide, and a polyester.

46. The use or the method of any one of embodiments 38 to 45, wherein from 60 to 75 weight-%, preferably from 63 to 72 weight-%, more preferably from 65 to 70 weight-% of the composition according to (iv) consist of water.

47. The use or the method of any one of embodiments 38 to 46, wherein at least 99 weight-%, preferably at least 99.5 weight-%, more preferably at least 99.9 weight-% of the composition according to (iv) consist of the titanium-containing zeolitic material having framework type MWW, the precursor of the silica binder, the water, and the kneading agent.

48. The use or the method of any one of embodiments 38 to 47, wherein the preparing of the composition according to (iv) comprises kneading the composition.

49. The use or the method of any one of embodiments 2 to 48, wherein the titanium-containing zeolitic material having framework type MWW provided in (i) has a water absorption capacity of at least 11 weight-% as determined according to Reference Example 1 herein.

50. The use or the method of embodiment 49, wherein the titanium-containing zeolitic material having framework type MWW provided in (i) has a water absorption capacity in the range of from 11 to 20 weight-%, preferably in the range of from 11.5 to 18 weight-%.

51. The use or the method of embodiment 50, wherein the titanium-containing zeolitic material having framework type MWW provided in (i) has a water absorption capacity in the range of from 12 to 16 weight-%.

52. The use or the method of any one of embodiments 1 to 51, wherein the composition has a relative plasticity $P_R$ in the range of from 0.1 to 0.9, preferably in the range of from 0.2 to 0.6.

53. The use or the method of any one of embodiments 1 to 52, wherein the composition the composition having a relative plasticity $P_R$ of less than 1 has a plasticity $P_A$ of at most 1,500 N, preferably in the range of from 400 to 1,250 N, more preferably in the range of from 450 to 1,000 N, as determined according to Reference Example 3 herein.

54. The use or the method of any one of embodiments 1 to 53, wherein for lowering the relative plasticity $P_R$ of the composition, one or more of a polystyrene, a polyacrylate, a polymethacrylate, a polyolefin, a polyamide, and a polyester are employed as an additional component of said composition.

55. The use or the method of any one of embodiments 1 to 54, wherein for lowering the relative plasticity $P_R$ of the composition, a polyalkylene oxide, preferably a polyethylene oxide is employed as an additional component of said composition.

56. Use of a polyethylene oxide for decreasing the plasticity of a composition comprising a titanium-containing zeolitic material having framework type MWW or a method for decreasing the plasticity of a composition comprising a titanium-containing zeolitic material having framework type MWW by using a polyethylene oxide as a component of said composition, wherein said polyethylene oxide has a mean molecular weight MW preferably in the range of from 100,000 to 6,000,000 g/mol, more preferably in the range of from 250,000 to 5,500,000 g/mol, more preferably in the range of from 500,000 to 5,000,000 g/mol, more preferably in the range of from 1,000,000 to 4,500,000 g/mol.

The present invention is further illustrated by the following reference examples, examples, and comparative examples.

EXAMPLES

Reference Example 1

Determination of the Water Adsorption Capacity

The water adsorption/desorption isotherms measurements were performed on a VTI SA instrument from TA Instruments following a step-isotherm program. The experiment consisted of a run or a series of runs performed on a sample material that has been placed on the microbalance pan inside of the instrument. Before the measurement was started, the residual moisture of the sample was removed by heating the sample to 100° C. (heating ramp of 5° C./min) and holding it for 6 h under a $N_2$ flow. After the drying program, the temperature in the cell was decreased to 25° C. and kept isothermal during the measurements. The microbalance was calibrated, and the weight of the dried sample was balanced (maximum mass deviation 0.01 weight-%). Water uptake by the sample was measured as the increase in weight over that of the dry sample. First, an adsorption curve was measured by increasing the relative humidity (RH) (expressed as weight-% water in the atmosphere inside of the cell) to which the samples was exposed and measuring the water uptake by the sample at equilibrium. The RH was increased with a step of 10% from 5% to 85% and at each step the system controlled the RH and monitored the sample weight until reaching the equilibrium conditions and recording the weight uptake. The total adsorbed water amount by the sample was taken after the sample was exposed to the 85% RH. During the desorption measurement the RH was decreased from 85% to 5% with a step of 10% and the change in the weight of the sample (water uptake) was monitored and recorded.

Reference Example 2

Determination of the pH

The pH was determined using a pH sensitive glass electrode.

Reference Example 3

Determination of Plasticity

The plasticity as referred to in the context of the present invention is to be understood as determined via a table-top testing machine Z010/TN2S, supplier Zwick, D-89079 Ulm, Germany. As to fundamentals of this machine and its operation, reference is made to the respective instructions handbook "Betriebsanleitung der Material-Prüfmaschine", version 1.1, by Zwick Technische Dokumentation, August-Nagel-Strasse 11, D-89079 Ulm, Germany (1999). The Z010 testing machine was equipped with a fixed horizontal table on which a steel test vessel was positioned comprising a cylindrical compartment having an internal diameter of 26 mm and an internal height of 75 mm. This vessel was filled with the composition to be measured so that the mass filled in the vessel did not contain air inclusions. The filling level was 10 mm below the upper edge of the cylindrical compartment. Centered above the cylindrical compartment of the vessel containing the composition to be measured was a plunger having a spherical lower end, wherein the diameter of the sphere was 22.8 mm, and which was freely movable in vertical direction. Said plunger was mounted on the load cell of the testing machine having a maximum test load of 10 kN. During the measurement, the plunger was moved vertically downwards, thus plunging into the composition in the test vessel. Under testing conditions, the plunger was moved at a preliminary force (Vorkraft) of 1.0 N, a preliminary force rate (Vorkraftgeschwindigkeit) of 100 mm/min and a subsequent test rate (Prüfgeschwindigkeit) of 14 mm/min. A measurement was terminated when the measured force reached a value of less than 70% of the previously measured maximum force of this measurement. The experiment was controlled by means of a computer which registered and evaluated the results of the measurements. The maximum force (F_max in N) measured corresponds to the plasticity referred to in the context of the present invention.

Reference Example 4

Particle Size Distribution 1.0 g of the zeolitic material to be subjected to measurement was suspended in 100 g deionized water and stirred about 10 min. The measurement of the particle size distribution was carried out in the liquid phase using a Mastersizer S long bed version 2.15, ser. No. 33544-325; supplier: Malvern Instruments GmbH, Herrenberg, Germany, using the following apparatus parameters:
focal width: 300 RF mm
beam length: 10.00 mm
module: MS17
shadowing: 16.9%
dispersion model: 3$$D
analysis model: polydisperse
correction: none The term "Dv10 value" as referred to in the context of the present invention describes the average particle size where 10 volume-% of the particles of the micropowder have a smaller size. Similarly, the term "Dv50 value" as referred to in the context of the present invention describes the average particle size where 50 volume-% of the particles of the micropowder have a smaller size, and the term "Dv90 value" as referred to in the context of the present invention describes the average particle size where 90 volume-% of the particles of the micropowder have a smaller size.

Reference Example 5

Providing a Titanium-Containing Zeolitic Material Having Framework Type MWW

The synthesis mixture had the following composition: 1.0 ($SiO_2$): 0.04 ($TiO_2$): 0.67 ($B_2O_3$): 1.4 piperidine: 19 $H_2O$.

Batch 0: 1.026 g of deionized water were initially introduced into a beaker, 365 g of piperidine were then added with stirring at 200 rpm, and the mixture was stirred for 10 min at pH 13.2 at about 23° C. Thereafter, the batch was divided into two equal parts.

Batch 1: 695.5 g of the deionized water-piperidine solution were placed in a beaker and, with stirring at 200 rpm, 248.4 g of boric acid were added and stirring was continued for 30 min, then 90 g of fumed silica (Cab-O-SIL® 5M) was added at about 23° C. The mixture was then stirred for 1 h at pH 11.4 at about 23° C.

Batch 2: 695.5 g of the deionized water-piperidine solution were initially introduced into a beaker, with stirring at 200 rpm at about 23° C., 43.2 g of tetrabutyl orthotitanate were added and stirring was continued for a further 30 minutes and then 90 g of fumed silica (Cab-O-SIL® 5M) were added. The mixture was then stirred for 1 h at pH 12.2 at about 23° C.

Batch 3: The two suspensions from batch 1 and 2 were mixed together for 1.5 h at pH 11.8 at about 23° C. to obtain the synthesis mixture and then crystallization was carried out in an autoclave under the following conditions: Heating in 1 h to 130° C./keeping for 24 h at 100 rpm at a pressure of from 0-2.7 bar, then, heating in 1 h to 150° C./keeping for 24 h at 100 rpm at a pressure of from 2.7-4.9 bar, then, heating in 1 h to 170° C./keeping for 120 h at 100 rpm at a pressure of from 4.9-9.4 bar.

After the above crystallization conditions, the thus obtained suspension having a pH of 11.3 was drained and filtered through a suction filter (giving a clear filtrate) and washed with 10 liters of deionized water (giving a turbid filtrate). The turbid filtrate was then acidified to pH 7 with 10% aqueous $HNO_3$. Subsequently, the moist product (filter cake) was filled into a porcelain dish, dried overnight, then ground. The yield was 192.8 g. According to the elemental analysis the resulting product had the following contents determined per 100 g substance of 9.6 g carbon, 0.85 g B, 21.8 g Si and 17.8 g Ti. The dried and ground material as obtained above was washed with $HNO_3$ solution (ratio of solid to liquid 1 g:20 ml) for 20 h at 100° C.: In a 10 liter glass flask 3600 g $HNO_3$ solution and 180 g B-Ti-MWW according to item (i) were added at 100° C., followed by boiling for 20 hours at reflux with stirring at 250 rpm. The thus obtained white suspension was filtered off and washed with 2×5 liters of deionized water. Drying: 10 h/120° C. Calcination: heating at 2 K/min to 530° C./keeping for 5 h. The yield was 143 g. According to the elemental analysis the resulting product had the following contents determined per 100 g substance: <0.1 g carbon (TOC), 0.27 g B, 42 g Si, and 2 g Ti. The BET surface area was determined to be 532 m$^2$/g. The crystallinity of the product was measured (Reference Example 8) to be 80% and the average crystal size as calculated from the XRD diffraction data was determined to be 22 nm. The respectively obtained material was washed with HNO$_3$ solution (ratio of solid to liquid 1 to 20 ml) for 20 h at 100° C. om a 10 fiber glass flask, 2.400 g pf HO$_3$ solution and 120 g of B-Ti-MWW obtained as above were added at 100° C., followed by boiling for 20 hours at reflux with stirring at 250 rpm. The white suspension was filtered off and washed with 7×1 liter of deionized water. Drying: 10 h/120° C. Calcination: heating at 2 K/min to 530° C./keeping for 5 h. The yield was 117 g. According to the elemental analysis the resulting product had the following contents determined per 100 g substance: <0.03 g B, 44 g Si, and 1.8 g Ti. The BET specific surface area was determined to be 501 m$^2$/g. The water adsorption capacity as determined by Reference Example 1 herein was 13.2 weight-%. The crystallinity of the product was measured to be 94% and the average crystal size as calculated from the XRD diffraction data was determined to be 22 nm. The XRD of the resulting product confirmed that the zeolitic material obtained had an MWW framework structure.

Comparative Example 1

Preparing a Composition Starting from a Non-Acid-treated Titanium-Containing Zeolitic Material Having Framework Type MWW a) Provided was a calcined titanium-containing zeolitic material having framework type MWW. This zeolitic material was obtained from Zheijang TWRD New Material Co. Ltd., Lugu Avenue 335, Shuige Industry Development Zone, Lishui, Zhejiang. This zeolitic material had a water absorption capacity, determined as described in Reference Example 1 herein, of 13.0 weight-%. Further, the zeolitic material was characterized by a silicon content of 43 weight-%, calculated as elemental silicon, and a titanium content of 1.9 weight-%, calculated as elemental titanium, each based on the total weight of the zeolitic material. The zeolitic framework consisted of silicon, titanium, oxygen and hydrogen. The zeolitic material had a particle size distribution determined as described in Reference Example 4 hereinabove, characterized by a Dv10 value of from 2.2 to 2.3 micrometer, a Dv50 value of from 9 to 10.8 micrometer and a Dv90 value of from 27.1 to 31.6 micrometer.

b) In this titanium-containing zeolitic material having framework type MWW, zinc was incorporated. In a vessel, a solution of 1,200 kg deionized water and 7.34 kg zinc acetate dihydrate was prepared within 30 min. Under stirring at 40 r.p.m., 40 kg of the titanium-containing zeolitic material having framework type MWW provided in a) were suspended. Within 1 h, the suspension was heated to a temperature of 100° C. and kept at that temperature for 2 h under reflux at a stirring of 70 r.p.m. Thereafter, the suspension was cooled to at temperature of less than 50° C. The respectively cooled zinc containing titanium-containing zeolitic material having framework type MWW was separated from the suspension by filtration in a suction filter and filtrated at an absolute pressure of 2.5 bar under nitrogen. Then, the filter cake was washed with deionized water, and the washed filter cake was dried in a nitrogen stream at room temperature. Subsequently, it was calcined for 2 h at 650° C. under air in a rotary furnace. The zinc containing titanium-containing zeolitic material having framework type MWW had a silicon content, calculated as elemental silicon, of 41 weight-%, a titanium content, calculated as elemental titanium, of 2.5 weight-% and a zinc content, calculated as elemental zinc, of 1.7 weight-%, each based on the total weight of the zinc containing titanium-containing zeolitic material having framework type MWW.

c) Based on this titanium-containing zeolitic material having framework type MWW comprising zinc, a composition was prepared as follows:
The components water, polyethylene oxide, methyl cellulose (Walocel®) and colloidal silica (Ludox® AS40) and the zeolitic material having framework type MWW comprising zinc were mixed in amounts so that the following weight ratios, rounded to one decimal place, were achieved:
polyethylene oxide:zeolitic material=0:1 (no polyethylene oxide used);
water:zeolitic material=1.1:1;
methyl cellulose:zeolitic material=0.1:1;
colloidal silica:zeolitic material=0.6:1.
For kneading the composition, the components were mixed for a total time of 45 minutes in an edge mill at a speed of 32 r.p.m. (revolutions per minute). The composition obtained from the kneading in the koller was 3,536 N.

Example 1

Preparing a Composition Starting from an Acid-Treated Titanium-Containing Zeolitic Material Having Framework Type MWW a) Provided was the calcined titanium-containing zeolitic material having framework type MWW as described in Comparative Example 1a) hereinabove. This titanium-containing zeolitic material having framework type MWW was then acid-treated as described in Example 5.3 c) of WO 2013/117536 A.

b) In this titanium-containing zeolitic material having framework type MWW, zinc was incorporated as described in Comparative Example 1b) hereinabove. The zinc containing titanium-containing zeolitic material having framework type MWW had a silicon content, calculated as elemental silicon, of 41 weight-%, a titanium content, calculated as elemental titanium, of 2.5 weight-% and a zinc content, calculated as elemental zinc, of 1.7 weight-%, each based on the total weight of the zinc containing titanium-containing zeolitic material having framework type MWW.

c) Based on this titanium-containing zeolitic material having framework type MWW comprising zinc, a composition was prepared as follows: The components water, polyethylene oxide, methyl cellulose (Walocel®) and colloidal silica (Ludox® AS40) and the zeolitic material having framework type MWW comprising zinc were mixed in amounts so that the following weight ratios, rounded to one decimal place, were achieved:

polyethylene oxide:zeolitic material=0:1 (no polyethylene oxide used);
water:zeolitic material=2.2:1;
methyl cellulose:zeolitic material=0.1:1;
colloidal silica:zeolitic material=0.6:1.
For kneading the composition, the components were mixed for a total time of 45 minutes in an edge mill at a speed of 32 r.p.m. (revolutions per minute). The composition obtained from the kneading in the koller was 880 N.

Example 2

Preparing a Composition Starting from an Acid-Treated Titanium-Containing Zeolitic Material Having Framework Type MWW a)/b) Provided was the zinc containing titanium-containing zeolitic material having framework type MWW as described in Example 1b) hereinabove.
c) Based on this titanium-containing zeolitic material having framework type MWW comprising zinc, a composition was prepared as follows:
The components water, polyethylene oxide (Alkox® E-160 from Kowa), methyl cellulose (Walocel®) and colloidal silica (Ludox® AS40) and the zeolitic material having framework type MWW comprising zinc were mixed in amounts so that the following weight ratios, rounded to one decimal place, were achieved:
polyethylene oxide:zeolitic material=0.02:1;
water:zeolitic material=2.2:1;
methyl cellulose:zeolitic material=0.1:1;
colloidal silica:zeolitic material=0.6:1.
For kneading the composition, the components were mixed for a total time of 45 minutes in an edge mill at a speed of 32 r.p.m. (revolutions per minute). The composition obtained from the kneading in the koller was 700 N.

SUMMARY OF RESULTS

As shown above, the composition according to Example 1 which differs from the composition of Comparative Example 1 in that the titanium-containing zeolitic material is used in its acid-treated form (it is noted the that slight difference in the water content does not influence the plasticity to a substantial extent), exhibits a plasticity $P_A$ of only 880 N, compared to the plasticity $P_N$ of 3,536 N observed for the composition of the Comparative Example 1. Thus, it is shown that the use of the acid-treated leads to a relative plasticity $P_R=P_A/P_N$ of 0.25. As further shown above, the composition according to Example 2 which differs from the composition of Example 1 in that polyethylene was used as an additional component, exhibits a plasticity of 700 N, compared to the plasticity of 880 N observed for the composition of Example 1. Thus, it is shown that polyethylene oxide is successfully used for decreasing the plasticity of a composition comprising a titanium-containing zeolitic material having framework type MWW.

CITED LITERATURE

WO 2013/117536 A

The invention claimed is:
1. A process of forming a shaped catalyst composition comprising titanium-containing zeolitic material having framework type MWW and comprising zinc, the process comprising acid treating a titanium-containing zeolitic material having framework type MWW (Ti-MWW) and incorporating zinc in said acid-treated Ti-MWW to obtain a composition comprising titanium-containing zeolitic material having framework type MWW and comprising zinc having a relative plasticity $P_R$ of less than 1, wherein the relative plasticity is defined as the plasticity $P_A$ of said composition divided by the plasticity $P_N$ of a composition which differs from said composition in that the titanium-containing zeolitic material having framework type used for preparing the composition is not acid-treated; and shaping the composition comprising titanium-containing zeolitic material having framework type MWW and comprising zinc,
wherein the acid-treated titanium-containing zeolitic material having framework type MWW is obtained by a process comprising
(i) providing a titanium-containing zeolitic material having framework type MWW;
(ii) preparing the acid-treated titanium-containing zeolitic material having framework type MWW by subjecting the titanium-containing zeolitic material having framework type MWW provided in (i) to an acid treatment, comprising
(ii.1) preparing an aqueous suspension comprising an aqueous liquid phase and the titanium-containing zeolitic material having framework type MWW provided in (i), wherein the aqueous liquid phase comprises water and an acid;
(ii.2) heating the aqueous suspension according to (ii. 1);
(ii.3) separating the acid-treated titanium-containing zeolitic material having framework type MWW from the liquid phase of the aqueous suspension according to (ii. 2);
wherein the process further comprises
(iii) incorporating zinc in the acid-treated titanium-containing zeolitic material having framework type MWW according to (ii), wherein in (iii), the incorporating of zinc comprises
(iii.1) preparing an aqueous suspension comprising an aqueous liquid phase and the acid-treated titanium-containing zeolitic material having framework type MWW, wherein the aqueous liquid phase comprises water and a dissolved zinc salt;
(iii.2) heating the aqueous suspension according to (iii.1);
(iii.3) separating the acid-treated titanium-containing zeolitic material having framework type MWW and comprising zinc from the liquid phase of the aqueous suspension according to (iii.2);
wherein in the aqueous suspension according to (iii.1), the weight ratio of the dissolved zinc salt, calculated as elemental zinc, relative to the acid-treated titanium-containing zeolitic material having framework type MWW is in the range of from 0.01:1 to 0.2:1;
wherein in (iii.2), the aqueous suspension according to (iii.1) is heated to a temperature of the suspension in the range of from 65 to 135° C.;
wherein the separating of the acid-treated titanium-containing zeolitic material having framework type MWW and comprising zinc from the liquid phase of the aqueous suspension according to (iii.2) further comprises drying the acid-treated titanium-containing zeolitic material having framework type MWW and comprising zinc, and further comprises calcining the acid-treated titanium-containing zeolitic material having framework type MWW and comprising zinc;

wherein for lowering the relative plasticity $P_R$ of the composition, at least one selected from the group consisting of a polystyrene, a polyacrylate, a polymethacrylate, a polyolefin, a polyamide, and a polyester are employed as an additional component of said composition.

2. The process of claim 1, wherein at least 99 weight-% of the zeolitic framework of the titanium-containing zeolitic material having framework type MWW provided in (i) consist of Ti, Si, O, and H, wherein the titanium-containing zeolitic material having framework type MWW provided in (i) comprises titanium, calculated as elemental titanium, in an amount in the range of from 0.1 to 5 weight-%, based on the total weight of the titanium-containing zeolitic material having framework type MWW.

3. The process of claim 1, wherein the titanium-containing zeolitic material having framework type MWW provided in (i) comprises particles exhibiting a particle size distribution characterized by a Dv10 value in the range of from 1 to 5 micrometer, a Dv50 value in the range of from 7 to 15 micrometer, and a Dv90 value in the range of from 20 to 40 micrometer.

4. The process of claim 1, wherein the acid comprised in the aqueous liquid phase comprises one or more inorganic acids.

5. The process of claim 1, wherein in (ii.2), the aqueous suspension according to (ii.1) is heated to a temperature of the suspension in the range of from 50 to 175° C., wherein in (ii.2), the aqueous suspension is kept at said temperature for 0.1 to 6 h.

6. The process of claim 1, wherein the separating of the acid-treated titanium-containing zeolitic material having framework type MWW from the liquid phase of the aqueous suspension according to (ii.2) comprises drying the acid-treated titanium-containing zeolitic material having framework type MWW, and further comprises calcining the dried acid-treated titanium-containing zeolitic material having framework type MWW.

7. The process of claim 1, wherein preparing the composition having a relative plasticity $P_R$ of less than 1 comprises
(iv) mixing the titanium-containing zeolitic material having framework type MWW obtained from (ii) or (iii), with a precursor of a silica binder, water, and a kneading agent
wherein the kneading agent comprised in the composition according to (iv) comprises one or more hydrophilic polymer;
wherein the precursor of the silica binder comprised in the composition according to
(iv) comprises one or more of a silica gel, a precipitated silica, a fumed silica, and a colloidal silica;
wherein at least 99 weight-% of the composition according to (iv) consist of the titanium-containing zeolitic material having framework type MWW, the precursor of the silica binder, the water, and the kneading agent.

8. The process of claim 1, wherein the titanium-containing zeolitic material having framework type MWW provided in (i) has a water absorption capacity of at least 11 weight-%.

9. The process of claim 1, wherein the composition has a relative plasticity $P_R$ in the range of from 0.1 to 0.9.

10. The process of claim 1, wherein the composition having a relative plasticity $P_R$ of less than 1 has a plasticity $P_A$ of at most 1,500 N.

11. A process of decreasing the plasticity of a composition comprising a titanium-containing zeolitic material having framework type MWW and comprising zinc, or decreasing the plasticity of a composition comprising a titanium-containing zeolitic material having framework type MWW and comprising zinc, the method comprising acid treating a titanium-containing zeolitic material having framework type MWW (Ti-MWW) and incorporating zinc in said acid-treated Ti-MWW to obtain a composition comprising titanium-containing zeolitic material having framework type MWW and comprising zinc, the method comprising combining the composition comprising the titanium-containing zeolitic material having framework type MWW and comprising zinc having an initial plasticity with a polyethylene oxide to obtain a mixture having a plasticity lower than the initial plasticity,
wherein the acid-treated titanium-containing zeolitic material having framework type MWW is obtained by a process comprising
(i) providing a titanium-containing zeolitic material having framework type MWW;
(ii) preparing the acid-treated titanium-containing zeolitic material having framework type MWW by subjecting the titanium-containing zeolitic material having framework type MWW provided in (i) to an acid treatment, comprising
(ii.1) preparing an aqueous suspension comprising an aqueous liquid phase and the titanium-containing zeolitic material having framework type MWW provided in (i), wherein the aqueous liquid phase comprises water and an acid;
(ii.2) heating the aqueous suspension according to (ii. 1):
(ii.3) separating the acid-treated titanium-containing zeolitic material having framework type MWW from the liquid phase of the aqueous suspension according to (ii. 2),
wherein the process further comprises
(iii) incorporating zinc in the acid-treated titanium-containing zeolitic material having framework type MWW according to (ii), wherein in (iii), the incorporating of zinc comprises
(iii.1) preparing an aqueous suspension comprising an aqueous liquid phase and the acid-treated titanium-containing zeolitic material having framework type MWW, wherein the aqueous liquid phase comprises water and a dissolved zinc salt;
(iii.2) heating the aqueous suspension according to (iii.1);
(iii.3) separating the acid-treated titanium-containing zeolitic material having framework type MWW and comprising zinc from the liquid phase of the aqueous suspension according to (iii.2);
wherein in the aqueous suspension according to (iii.1), the weight ratio of the dissolved zinc salt, calculated as elemental zinc, relative to the acid-treated titanium-containing zeolitic material having framework type MWW is in the range of from 0.01:1 to 0.2:1;
wherein in (iii.2), the aqueous suspension according to (iii.1) is heated to a temperature of the suspension in the range of from 65 to 135° C.;
wherein the separating of the acid-treated titanium-containing zeolitic material having framework type MWW and comprising zinc from the liquid phase of the aqueous suspension according to (iii.2) further comprises drying the acid-treated titanium-containing zeolitic material having framework type MWW and comprising zinc, and further comprises calcining the acid-treated titanium-containing zeolitic material having framework type MWW and comprising zinc.

* * * * *